United States Patent [19]
Buckmaster et al.

[11] Patent Number: 5,726,214
[45] Date of Patent: Mar. 10, 1998

[54] SELF-FOAMING FLUOROPOLYMER COMPOSITION

[75] Inventors: Marlin Dwight Buckmaster, Vienna, W. Va.; Stuart Karl Randa, Wilmington, Del.

[73] Assignee: E. I. du Pont de Nemours and Company, Wilmington, Del.

[21] Appl. No.: 774,164

[22] Filed: Dec. 26, 1996

[51] Int. Cl.$^6$ .................. C08J 9/00; C08F 14/02
[52] U.S. Cl. .................. 521/145; 521/79; 521/85; 521/92; 521/93; 521/94; 521/103; 521/107; 521/124; 521/125
[58] Field of Search .................. 521/125, 145, 521/124, 79, 85, 92, 93, 94, 103, 107

[56] References Cited

U.S. PATENT DOCUMENTS

| | | |
|---|---|---|
| 2,946,763 | 7/1960 | Bro et al. . |
| 3,006,029 | 10/1961 | Saxton . |
| 3,072,583 | 1/1963 | Randa . |
| 3,085,083 | 4/1963 | Schreyer . |
| 3,635,926 | 1/1972 | Gresham et al. . |
| 3,969,435 | 7/1976 | Bailey et al. . |
| 4,001,351 | 1/1977 | Roura . |
| 4,380,618 | 4/1983 | Khan et al. ............... 526/206 |
| 4,626,587 | 12/1986 | Morgan et al. ............ 528/481 |
| 4,743,658 | 5/1988 | Imbalzano et al. ........ 525/326.4 |
| 4,764,538 | 8/1988 | Buckmaster et al. ...... 521/85 |
| 4,877,815 | 10/1989 | Buckmaster et al. ...... 521/85 |
| 4,946,902 | 8/1990 | Bekiarian et al. ......... 525/326.2 |
| 5,023,279 | 6/1991 | Buckmaster et al. ...... 521/85 |
| 5,032,621 | 7/1991 | Buckmaster et al. ...... 521/85 |
| 5,045,605 | 9/1991 | Buckmaster ............... 525/378 |
| 5,115,038 | 5/1992 | Ihara et al. ............... 525/326.2 |
| 5,374,683 | 12/1994 | Morgan ................... 525/200 |
| 5,610,203 | 3/1997 | Buckmaster et al. ...... 521/85 |

FOREIGN PATENT DOCUMENTS 1 210 794   10/1970   United Kingdom .

*Primary Examiner*—John M. Cooney, Jr.

[57] ABSTRACT

Fluoropolymer having unstable end groups is used to form foamed fluoropolymer structures without added blowing agent.

12 Claims, No Drawings

1

SELF-FOAMING FLUOROPOLYMER COMPOSITION

FIELD OF THE INVENTION

This invention is in the field of fluoropolymers for producing foamed structures.

BACKGROUND OF THE INVENTION

Processes for foaming thermoplastics, and foamable thermoplastic compositions suitable for use in such processes, are well known. Foaming processes typically involve melting of thermoplastic resin in an extruder, incorporation of a gas (blowing agent) or source of gas (e.g., chemical blowing agent) into the thermoplastic before or after melting, and then extruding the molten thermoplastic through a die to form a foamed structure. Foamable thermoplastic compositions suitable for use in such processes typically contain nucleating agent to control the size of pores formed. Small uniform foam cell size is usually desired. Representative foaming processes and foamable compositions are described in U.S. Pat. Nos. 3,072,583; 4,764,538; 4,877,815; 5,023,279 and 5,032,621.

Commercial acceptance of thermoplastics for melt fabrication generally dictates that the thermoplastics be sufficiently stable that they can be fabricated without degrading to the point that mechanical properties suffer or that degradation products cause bubble formation. Numerous processes for stabilizing fluoropolymers, particularly for stabilizing end groups, are known in the art. For example, Schreyer in U.S. Pat. No. 4,001,351 discloses a process for converting unstable carboxylate end groups on tetrafluoroethylene copolymer to obtain more stable hydride ends to reduce the tendency of the copolymer to bubble. This process itself is accompanied by substantial bubbling that can cause problems in carrying out the process, as disclosed by Bailey & Roura in U.S. Pat. No. 3,969,435 and by Roura in U.S. Pat. No. 4,001,351. Some other processes for stabilizing fluoropolymers are disclosed in British Patent 1,210,794 and in U.S. Pat. Nos. 4,626,587; 4,743,658; 4,946,902; 5,045,605 and 5,115,038.

Since stable polymer resins are those available for commercial use, they are the resins that have been used in foaming processes and foamable compositions as discussed above.

SUMMARY OF THE INVENTION

This invention provides a self-foaming composition comprising melt-fabricable perfluoropolymer having as least 25 carboxyl groups per $10^6$ carbon atoms present in said polymer and a nucleating effective amount of foam nucleant.

The invention also provides a process for foaming perfluoropolymer, said polymer having at least 25 carboxyl groups per $10^6$ carbon atoms, comprising converting any of said carboxyl groups that are —COOH groups to metal salt thereof, incorporating a nucleating effective amount of foam nucleant into said polymer resin, and melt fabricating said polymer resin at a temperature which decarboxylates end groups of said polymer, thereby foaming said polymer resin.

DETAILED DESCRIPTION OF THE INVENTION

It has been discovered that unstabilized fluoropolymer, that is, fluoropolymer having unstable carboxyl end groups and heretofore regarded as useless for fabrication of articles, can be used in controlled foaming processes to produce foamed structures. Furthermore, the foaming process simultaneously converts these unstable ends predominantly to stable ends so that the foamed structure produced is quite stable thermally and hydrolytically.

Fluoropolymers that can be used in the practice of this invention are melt fabricable. As such, they typically have melt flow rate (MFR) in the range 3–50 g/10 min as measured according to ASTM D-1238 using conditions conventionally used for the particular polymer composition, though viscosities outside this range are known, and recognizing that the instability of the polymer can cause uncertainty in the measurement. MFR in the range 5–30 g/10 min is especially useful for the foaming process of this invention. The fluoropolymer can have main chain composition similar to that of stabilized fluoropolymer used in prior-art foamable compositions and foaming processes. Useful fluoropolymers include the group of tetrafluoroethylene (TFE) copolymers, particularly the copolymers of TFE with one or more comonomers selected from perfluoroolefins having 3–8 carbon atoms, preferably hexafluoropropylene (HFP), and perfluoro(alkyl vinyl ether) (PAVE) with alkyl groups having 1–5 carbon atoms, preferably 1–3 carbon atoms, most preferably 2–3 carbon atoms. Such copolymers have sufficient concentration of comonomer to reduce the melting temperature of the copolymer significantly below that of TFE homopolymer. Preferred fluoropolymers include TFE/HFP, TFE/PAVE, and TFE/HFP/PAVE.

An unstable end group that is particularly useful in this invention is carboxyl. By "carboxyl" is meant end group structure of the formula —COOH or —COOM or mixture thereof, wherein M is one or more alkali metal or alkaline earth metal ion. The concentration of carboxyl ends should be sufficient to provide a void fraction of at least 20% in the foamed fluoropolymer structure. Usually, a sufficient concentration of carboxyl ends is at least about $25/10^6$ carbon atoms in the fluoropolymer, preferably at least $50/10^6$ carbon atoms. The concentration of such ends can be determined by infrared spectroscopy.

Any process that will produce fluoropolymer having an adequate population of carboxylate ends can be used to prepare fluoropolymer used in compositions of this invention. Such fluoropolymer can be prepared, for example, by aqueous dispersion polymerization using water soluble free radical initiators such as ammonium persulfate (APS) or potassium persulfate (KPS). Numerous references disclose such processes. Representative of these are Bro & Sandt in U.S. Pat. No. 2,946,763 and Khan & Morgan in U.S. Pat. No. 4,380,618. The dispersion of fluoropolymer particles produced by such polymerization processes is typically coagulated by known mechanical and/or chemical methods, separated from the liquid, and dried to yield a finely divided powder. Some end groups not initially present from polymerization as carboxyl end groups can be converted to carboxyl end groups, e.g., by hydrolysis of —COF end groups.

The foaming process of this invention is facilitated if the foamable composition contains an effective concentration of one or more alkali metal or alkaline earth metal salts to catalyze decomposition of carboxyl end groups. Such metal compound can be present in the foamable composition as residue from the polymerization process, such as from KPS initiator, or can be added to the polymer resin after polymerization and isolation, or both. The effective amount of metal salt will depend on the void content desired in the foamed structure, the carboxyl end group population in the fluoropolymer resin, and the fabrication conditions for making the foamed structure. Generally, an effective concentration is in the range of 30–200 ppm, calculated as the weight of metal ion relative to weight of fluoropolymer resin. Higher concentrations of alkali or alkaline earth metal ion are not needed, but more can be present, e.g., as a component of filler or pigment or other additive.

Foamable compositions of this invention contain a nucleating effective amount of foam nucleating agent (foam nucleant), which can be a combination of nucleating agents or a combination of nucleating agents and enhancers. Effectiveness of foam nucleating agents is commonly judged in terms of size and uniformity of foam cells (voids). Small uniform foam cell size, that is, foam cell size that is small with respect to the dimensions of the foamed structure, is usually desired. The foam cell size that is achievable in a given instance depends on a number of factors, including resin viscosity, void content of the foam, and process conditions such as the amount of shear and the pressure drop when the structure is formed by extrusion. Known nucleating agents are suitable, and include boron nitride (BN, U.S. Pat. No. 3,072,583), BN and certain inorganic salts (U.S. Pat. No. 4,764,538), and sulfonic and phosphonic acids and salts thereof (U.S. Pat. No. 5,023,279), and combinations thereof. As known in the art, the concentration of nucleating agent required for effective foam cell nucleation will vary with the nucleating agent as well as with the fluoropolymer used, the process employed, and the specific processing conditions. Generally, the effective amount of nucleant will be in the range of 100 ppm to 2 wt % based on the weight of polymer resin. It should be noted that foam nucleating agent can be a source of alkali or alkaline earth metal ion to facilitate decarboxylation of unstable end groups. For example, a nucleating agent that is a combination of BN and calcium tetraborate can provide sufficient calcium ions to catalyze decomposition of carboxyl end groups.

Foamable perfluoropolymer compositions of this invention can contain other materials such as fillers or pigments, as known in the art. Foamable compositions can include other perfluoropolymer resin in addition to perfluoropolymer having unstable end groups, in particular perfluoropolymer resin having relatively stable end groups, or a low concentration of unstable end groups. That is, the perfluoropolymer resin can be a blend of compatible perfluoropolymer resins. A foamable composition incorporating such blend is within the scope of this invention if the concentration of unstable ends is at least about 25 per $10^6$ carbon atoms calculated on the basis of total perfluoropolymer in the composition. One common way in which such blends might occur is to use a commercial pigment concentrate in stabilized perfluoropolymer to color a foamable composition of this invention.

Self-foaming compositions of this invention can be used to make foamed fluoropolymer resin structures having properties as generally known in the art. A self-foaming composition is preferably capable of self-foaming to achieve at least 20% voids. Such compositions are suitable, for example, for making foamed structures having 20–75% voids, preferably 40–65% voids.

In preparing prior-art foamable compositions, common practice is to disperse nucleating agent into thermoplastic resin in melt blending equipment such as twin-screw extruders or internal mixers to produce cubes for subsequent re-extrusion by the artisan who makes the foamed structure. Such techniques are not preferred for preparing foamable compositions of this invention because of premature foaming. In general, it is better to avoid melting the fluoropolymer used in this invention until the melting necessary for the final foaming process. One method of preparing a foamable composition that has been found satisfactory is to make a dry blend of fluoropolymer powder and nucleating agent, and metal-containing salt if desired, and to use a roll compactor (e.g., Chilsonator®, The Fitzpatrick Co.) and grinder (e.g., FitzMill®, The Fitzpatrick Co.) to form granules, or a pellet mill (e.g., California Pellet Mill) to form pellets, to obtain a physical form suitable for feeding to an extruder. If suitable handling equipment is available, the components of the foamable composition can be metered to the foaming equipment and mixed therein. Another method is to add nucleating agent and metal salt to the fluoropolymer dispersion from polymerization and co-coagulate the mixture, optionally employing the technique known as solvent-aided pelletization to obtain free-flowing beads. As is well known in the art, nucleating agent components and fluoropolymer resin can be combined in other ways to achieve foamable compositions. For example, a nucleating agent concentrate, or individual concentrates of each nucleating agent component, in fluoropolymer can be blended with fluoropolymer to obtain the desired composition. In the foregoing case, the fluoropolymer used in the two components of the blend will normally be the same, but can be different if the different fluoropolymers are compatible. Since concentrates introduce a small part of total fluoropolymer, the resin used in a nucleating agent concentrate can even be previously stabilized fluoropolymer resin. When nucleating agent is combined directly with fluoropolymer resin powder, it is desirable to achieve an intimate blend using mechanical means such as a HENSCHEL mixer (Purnell International).

In carrying out the foaming process of this invention, the foamable composition comprising fluoropolymer having unstable end groups, metal ion, and nucleating agent can be processed generally as in known foaming processes, except that it is not necessary to add foaming agent, or to add as much foaming agent. Thus, the composition is self-foaming. That is, the foamable composition is brought to a molten state, shaped and allowed to expand, or allowed to expand to fill a cavity of defined shape, or even allowed to expand without confinement on all surfaces, and then cooled to solidify. The self-foaming composition can be brought to a molten state under applied pressure, such as in an extruder or injection molding machine, after which the pressure is reduced, such as by extrusion through a die or injection into a mold cavity, to permit foaming. Alternatively, for example, the self-foaming composition can be heated to the molten state free of applied pressure, with resultant foaming causing the composition to expand during melt coalescence. While it is contemplated that the foaming process of this invention is advantageously carried out without addition of foaming agent, it is recognized that the self-foaming capability of the foamable composition of the invention can be supplemented by addition of foaming agent, such as injected gas, e.g., nitrogen, air, and the like, or incorporated chemical agent. Such supplemental addition is within the scope of the invention. The fluoropolymer composition and the foaming process of this invention can be used to make foamed structures as known in the art, including wire insulation and shapes such as sheet, block, billet, and the like having such utilities as thermal insulation and gasketing.

During the foaming process of this invention, the unstable end groups of the fluoropolymer decompose, with decomposition catalyzed by the presence of metal ions. The decarboxylation process liberates volatiles e.g., $CO_2$, in sufficient quantity to cause foaming. That is, the carboxyl end groups are thermally cleavable from said polymer to form gas within said composition during melt fabrication, which gas is nucleated by the nucleating agent to form bubbles and thereby to form foam having small uniform cells. Thus, the fluoropolymer provides its own blowing agent, and in this sense the fluoropolymer composition is self-foaming. During the foaming process, carboxylate end groups are converted to stable hydride end groups. Surprisingly, the decomposition of the carboxylate end groups can be caused to occur in times practical for commercial fabrication processes, and can be controlled in such processes to obtain useful foamed structures.

EXAMPLES

Fluoropolymers used in Examples 1-3 below were copolymers of TFE with HFP prepared generally by the process of Bro & Sandt (U.S. Pat. No. 2,946,763) using a mixed APS/KPS initiator system. One of the fluoropolymers employed additionally contained perfluoro(propyl vinyl ether) (PPVE) and was prepared by including PPVE in the initial charge to the reactor. HFP content was determined by the infrared method disclosed by Morgan in U.S. Pat. No. 5,374,683 except that the sample film was cold pressed and the factor employed to convert HFP index (HFPI, called specific IR ratio by Bro & Sandt) to HFP content in wt % was 3.0 instead of 4.5 as used by Bro & Sandt. PPVE content of the terpolymer was determined by the infrared method disclosed by Khan & Morgan in U.S. Pat. No. 4,380,618. MFR was determined by ASTM method D-1238-52T modified as described by Khan & Morgan.

The fluoropolymer used in Examples 4-5 was a copolymer of TFE with PPVE prepared generally according to the process of Gresham & Vogelpohl in U.S. Pat. No. 3,635,926 using ammonium persulfate (APS) initiator and ethane as chain transfer agent, except that no buffer was used (to assure carboxyl ends) and solvent was omitted.

Quantitative measurement of carboxyl end group populations in perfluoropolymer resins was carried out by infrared analysis according to the method disclosed in U.S. Pat. No. 5,374,683 which in turn was based on the general method taught in U.S. Pat. No. 3,085,083. The concentration of potassium in the resins was determined by x-ray fluorescence.

Unless otherwise stated, compositions containing nucleating agent and fluoropolymer resin having unstable end groups were prepared for extrusion by the following general procedure. The chosen nucleating agent was dry-blended with TFE/HFP copolymer resin powder having unstable end groups, with nucleating agent concentration 10× that desired for extrusion. This nucleating agent concentrate was formed into granules by compacting with a roll compacter and then granulating with a hammer mill (FitzMill®). The copolymer resin used in the nucleating agent concentrate will sometimes be called "concentrate resin". TFE/HFP copolymer resin powder without added nucleating agent was also formed into granules. The copolymer resin granulated without nucleating agent will sometimes be called "let-down resin". The two types of granules were combined for extrusion by dry blending one weight part of the nucleating agent concentrate with nine weight parts of the granules without nucleant, i.e., the concentration of nucleating agent was diluted (let down) to 10% of that in the concentrate. Characteristics of the concentrate resin and the let-down resin are given in summaries for each of the examples below.

In the following Examples 1-3, the extrusion foaming process was similar to that used for ordinary extrusion of full-density fluoropolymer resin. No gas was injected into the extruder, nor was chemical blowing agent added to the resin feed. The foam void level was controlled by temperature regulation and the holdup of fluoropolymer resin in the extruder. Nokia-Maillefer 45-mm and 60-mm extrusion wire lines were used in a melt draw extrusion technique to apply foamed insulation on AWG 22 (0.64 mm) solid copper conductor. The extruders had length/diameter ratio of 30/1 and were equipped with conventional mixing screws (See Saxton, U.S. Pat. No. 3,006,029) to provide a uniform melt. Details of screw design and extrusion conditions are given in Table 1.

Foam extrudate was characterized as follows. Capacitance and diameter of the foamed wire insulation were measured and recorded using the in-line monitoring devices with which the Nokia-Maillefer extrusion lines are equipped. Values given below are the average values and the average amplitudes of variation estimated from the strip chart record. Dielectric constant was calculated from average capacitance and average wire dimensions. In turn, void fraction was calculated from calculated dielectric constant and the known dielectric constants of air and the fluoropolymer resin used. Average foam cell size was determined at radial mid-wall of the foamed wire insulation by visual examination under a microscope equipped with a vernier eyepiece or by taking a photograph of a thin section of the foam at 25–40× magnification and measuring cell size on the photograph.

Example 1

In this example, the extrusion composition was prepared directly, without preparing a nucleating agent concentrate. The fluoropolymer resin was a blend of two unstabilized TFE/HFP copolymer resin powders. The first resin (60% of the blend) contained 12.6 wt % HFP, 400 carboxyl ends per $10^6$ carbon atoms, and 55 ppm potassium, and had MFR of 19.2 g/10 min. The second resin (40% of the blend) contained 11.6 wt % HFP, 340 carboxyl ends per $10^6$ carbon atoms, and 46 ppm potassium, and had MFR of 7.0 g/10 min. This resin powder blend was combined with 0.25 wt % BN (grade SHP-325, Carborundum) and 110 ppm calcium tetraborate, based on combined weight of powder, BN, and calcium tetraborate, and was then blended, compacted and granulated. This composition was extruded to make foamed fluoropolymer insulation as outlined above and in Table 1. Properties of the resultant foam core structure, also summarized in Table 1, show that the foamable composition of this invention can be foamed in a controlled way. As illustrated by the data, the diameter of the foamed structure was uniform and foam cells were small. Capacitance was uniform, independently indicating that the dimensions of the foamed structure and of the foam cells were uniform. Extrusion of TFE/HFP copolymer resin having a similar concentration of —COOH ends but containing no metal ion yielded extradate that was essentially void-free.

Example 2

The general procedure outlined above was used to prepare the extrusion composition. The concentrate resin was unstabilized TFE/HFP copolymer resin powder containing 11.6 wt % HFP, 340 carboxyl ends per $10^6$ carbon atoms, and 46 ppm potassium, and having MFR of 7.0 g/10 min. The let-down resin was unstabilized TFE/HFP copolymer powder containing 11.8 wt % HFP, 350 carboxyl ends per $10^6$ carbon atoms, and 50 ppm potassium, and having MFR of 7.2 g/10 min. The nucleating agent concentrate contained 2.5 wt % BN (SHP-325) and 1000 ppm of calcium tetraborate, based on combined weight of powder, BN and calcium tetraborate, so that the extrusion composition introduced into the feed hopper of the extruder was a blend containing 0.25 wt % BN and 100 ppm calcium tetraborate. This blend was extruded to make foamed fluoropolymer insulation as outlined above and in Table 1. The force required to strip the foamed insulation from the conductor was unusually high. Properties of the resultant foam core structure, also summarized in Table 1, show that the foamable composition of this invention can be foamed in a controlled way. As illustrated by the data, the diameter of the foamed structure was uniform and foam cells were small. Capacitance was uniform, independently indicating that the dimensions of the foamed structure and of the foam cells were uniform.

Example 3

The general procedure outlined above was used to prepare the extrusion composition. The concentrate resin was the same unstabilized TFE/HFP copolymer resin powder used in Example 2. Let-down resin was a mixture of two unstabilized TFE/HFP copolymer resin powders, one containing 11.8 wt % HFP, 325 carboxyl ends per $10^6$ carbon atoms, and 50 ppm potassium, and having MFR of 6.8 g/10 min, and the other containing 12.4 wt % HFP, 0.85 wt % PPVE, 410 carboxyl ends per $10^6$ carbon atoms, and 55 ppm potassium, and having MFR of 22.5 g/10 min. These let-down resin powders were blended 50/50 by weight before being formed into granules. The nucleating agent concentrate contained 2.5 wt % BN (SHP-325) and 1000 ppm of calcium tetraborate, based on combined weight of powder, BN and calcium tetraborate, so that the extrusion composition introduced into the feed hopper of the extruder was a blend containing 0.25 wt % BN and 100 ppm calcium tetraborate. This blend was extruded to make foamed fluoropolymer insulation as outlined above and in Table 1. Properties of the resultant foam core structure, also summarized in Table 1, show that the foamable composition of this invention can include a mixture of fluoropolymers. As illustrated by the data, the diameter of the foamed structure was uniform and foam cells were small. Capacitance was uniform, independently indicating that the dimensions of the foamed structure and of the foam cells were uniform.

TABLE 1

| Summary of Self-Foaming Extrusions | | | |
|---|---|---|---|
| Conditions & Results | 1 | 2 | 3 |
| Extruder | | | |
| Barrel diameter (mm) | 45 | 60 | 45 |
| Die diameter (mm) | 5.58 | 4.32 | 5.58 |
| Guide tip diameter (mm) | 1.90 | 1.91 | 1.91 |
| Screw flights/depth (mm) | | | |
| Feed zone | 10/8.3 | 12/11.4 | 12/11.4 |
| Transition | 3/— | 3/— | 1/— |
| Metering | 4/3.1 | none | 4/3.1 |
| Mixing | 4/5.1 | none | 4/5.1 |
| Pumping | 6/2.8 | 5/3.8 | 6/2.8 |
| Mixing | 4/5.1 | 10/7.1 | 4/5.1 |
| Temperatures (°C.) | | | |
| Rear | 338 | 357 | 338 |
| Center rear | 338 | 360 | 338 |
| Center | 338 | 360 | 338 |
| Center front | 341 | 362 | 341 |
| Front | 341 | 362 | 341 |
| Clamp | 357 | 357 | 357 |
| Adapter | 316 | 343 | 316 |
| Crosshead | 282 | 341 | 282 |

TABLE 1-continued

| Summary of Self-Foaming Extrusions | | | |
|---|---|---|---|
| Conditions & Results | 1 | 2 | 3 |
| Die | 274 | 357 | 271 |
| Melt | 338 | 362 | 339 |
| Wire preheat | 135 | 82 | 115 |
| Running conditions | | | |
| Screw speed (rpm) | 20 | 14 | 20 |
| Crosshead pressure (MPa) | 7.0 | 17.2 | 8.9 |
| X-head vacuum (mm Hg) | — | 100 | 80 |
| Wire speed (m/min) | 76 | 56 | 42 |
| Cone length (mm) | 51 | 19 | 51 |
| Air gap (m) | 12 | 10 | 10 |
| Extrudate properties | | | |
| Foam diameter (mm) | 2.36 ± 0.03 | 2.33 ± 0.01 | 2.35 ± 0.02 |
| Capacitance (pF/m) | 61.9 ± 0.3 | 60.2 ± 0.2 | 62.3 ± 0.7 |
| Dielectric constant | 1.44 | 1.40 | 1.46 |
| Foam cell diameter (mm) | 0.09 | 0.15 | 0.15 |
| Voids (%) | 50 | 55 | 50 |

Example 4

A TFE/PPVE copolymer resin powder having PPVE content of 4.2 wt % and MFR of 12.7 g/10 min was used. Two samples of this powder containing different foam nucleating agents were prepared by hand blending in a glass jar. Sample A contained 0.4 wt % of BN (Carborundum grade SHP-325) and 150 ppm of calcium tetraborate, while Sample B contained 1000 ppm of the barium salt of a mixture of perfluoroalkyl ethane sulfonic acids (CAS No. IC3-56-0). Concentrations of nucleating agent components are based on combined weight of resin and nucleant. Three 10-g aliquots of each of Sample A and B were placed in 2.75-inch (7.0-cm) diameter aluminum pans and heated in a circulating air oven at 385° C. for 10, 20 and 30 min, respectively. In each case, the copolymer resin melted and foamed due to decomposition of the carboxyl end groups. Since APS initiator was used, the nucleating agents were relied upon to provide sufficient metal ions to catalyze decomposition of the end groups. Foam cell size was relatively large due to the low-shear foaming process used, but the foam was uniform and essentially all foam cells were closed. Void content of the foam was estimated from the thickness of the foam structure and the thickness of an essentially void-free melted 10-g sample of resin having stable end groups. Results are summarized in Table 2.

TABLE 2

| Results for Example 4 | | | |
|---|---|---|---|
| | Voids (%) for Various Foaming Times | | |
| Sample | 10 min | 20 min | 30 min |
| A | 62 | 73 | 80 |
| B | 67 | 78 | 84 |

Example 5

This example illustrates that foam samples such as those made in Example 4 can be further treated by hot pressing or calendering to give foam sheet with lower void content and flat smooth surfaces. This technique could be used for making gasket sheet stock and the like. An aliquot of TFE/PPVE resin Sample A of Example 4 was heated in an aluminum pan for 30 min at 390° C. to give a foamed sheet about 12 mm thick with about 90% voids and having an uneven top surface. Two 3-cm square pieces were cut from this sheet, placed between polished aluminum sheets with the uneven side down and then between 1-mm thick stainless steel plates, and treated as follows. Sample C was given 2 min contact with the bottom platten of a laboratory press heated to 350° C. and was then placed in a cold press under slight pressure. The resultant foam sheet structure was about 7 mm thick and had about 80% voids. Sample D was given 1 min contact with both plattens of the 350° C. press and was then placed in a cold press for 3 min under 100 lb (45 kg) load. The resultant foam sheet was 2 mm thick and had about 40% voids. Void content of the pressed structures was estimated from thickness changes since the other dimensions changed by less than 10%. Both Sample C and D had relatively smooth, flat surfaces.

We claim:

1. A self-foaming composition comprising melt-fabricable perfluoropolymer having at least 25 carboxyl groups per $10^6$ carbon atoms present in said polymer and a nucleating effective amount of foam nucleating agent, at least said 25 carboxyl groups being present as metal salt or said composition containing metal compound for forming said metal salt during melt fabrication of said composition.

2. The composition of claim 1 wherein the metal of said metal salt comes from the polymerization initiator used in the polymerization of said perfluoropolymer.

3. The composition of claim 1 wherein said metal of said compound is alkali metal or alkaline earth metal.

4. The composition of claim 1, wherein said perfluoropolymer is copolymer of tetrafluoroethylene and at least one comonomer selected from perfluoroolefins having 3–8 carbon atoms and perfluoro(alkyl vinyl ether), said alkyl groups having 1–5 carbon atoms.

5. The composition of claim 4, wherein said perfluoropolymer is copolymer of tetrafluoroethylene and hexafluoropropylene.

6. The composition of claim 4, wherein said perfluoro (alkyl vinyl ether) is perfluoro(propyl vinyl ether) or perfluoro(ethyl vinyl ether).

7. A process for foaming melt-fabricable perfluoropolymer resin having at least 25 carboxyl groups per $10^6$ carbon atoms, comprising, incorporating a nucleating effective amount of foam nucleant into said polymer resin, and melt fabricating said polymer resin having said carboxyl groups present as metal salt, said salt being present before or formed during said fabricating, said melt fabricating being at a temperature which decarboxylates said carboxyl groups of said polymer, thereby foaming said polymer resin.

8. Foam perfluoropolymer structure formed by the process of claim 7.

9. The process of claim 7, wherein said melt fabricating is obtained by heating said composition free of applied pressure, whereby the foaming of said composition causes said composition to expand during said melt coalescence to form a foam structure.

10. The process of claim 9, wherein said heating is carried out with said composition in contact with at least one surface, whereby said foam structure is formed to have a void-free skin adjacent to each of said contacting surface.

11. The process of claim 9, and further comprising hot compressing opposite surfaces of said foam structure to obtain as a result thereof said foam structure having reduced thickness and void-free skin at each of said surfaces.

12. Foam structure obtained by the process of claim 11.

* * * * *